United States Patent Office.

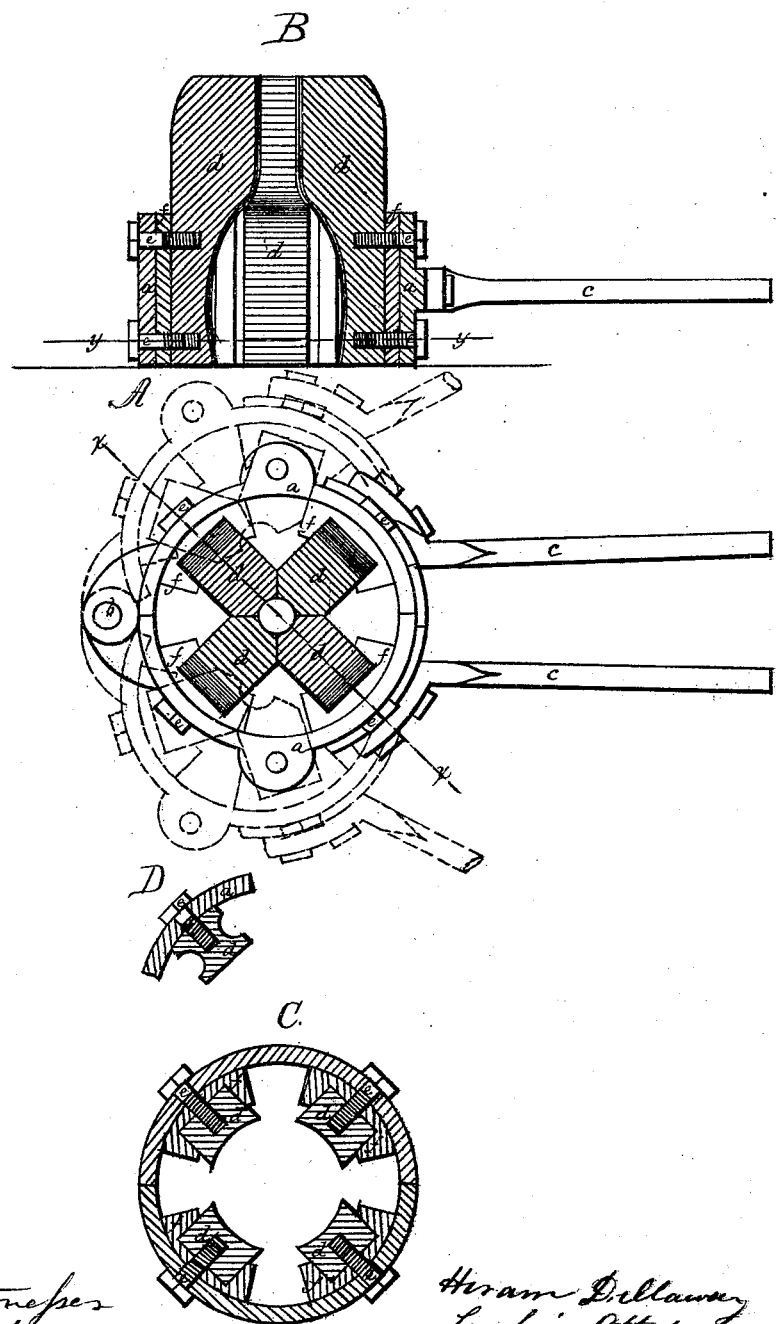

HIRAM DILLAWAY, OF SANDWICH, MASSACHUSETTS.

Letters Patent No. 100,127, dated February 22, 1870.

IMPROVED MOLD FOR FORMING BLOWN GLASSWARE.

The Schedule referred to in these Letters Patent and making part of the same.

*To all whom it may concern:*

Be it known that I, HIRAM DILLAWAY, of Sandwich, in the county of Barnstable, and State of Massachusetts, have invented an Improved Mold for Forming Blown Glass Bottles and other Glassware; and I do hereby declare that the following, taken in connection with the drawings which accompany and form part of this specification, is a description of my invention, sufficient to enable those skilled in the art to practice it.

This invention relates particularly to the construction of glass molds, in which the molding surfaces are formed of "graphite," "gas carbon," or "corrosion" of gas retorts, as shown in the United States Patent No. 91,946, though the invention is also applicable, to greater or lesser extent, to common metal and wood, and to stone-glass molds.

Ordinarily, glass molds, for forming round bottles and other blown ware, circular in section, are made with hinged jaws or members, the interior surfaces of which, when the mold is shut, form a matrix, fitting to the whole circular surface of the bottle or other article in process of formation.

In my invention, instead of making the mold of two or more jaws, which, when closed together, form a matrix, I construct the mold of several pieces, leaving between each two adjacent molding faces an open space. These separate pieces I prefer to make of gas-retort carbon or "corrosion," and I fasten each directly to the inner surface of one or the other of the open-and-shut jaws, or to suitable stocks fastened to the jaws.

My invention consists, primarily, in a glass mold for forming blown-round bottles and similar ware, having its molding surfaces composed of separate pieces, placed at intervals in the jaws, or so that their molding surfaces do not join.

The invention also consists in making a mold of pieces of gas carbon or gas-retort graphite, each of which pieces is separate from the others, all being united to the jaws to form the mold.

The invention further consists in making a mold with pieces, each of which is removably attached to the jaws, so that the same jaws may be used for reception of dies for the formation of an indefinite number of molds, instead of requiring a separate number of molds for each, and also so that small pieces of graphite or other material, otherwise useless, may be used in making up the mold.

The drawings represent a mold embodying my improvements.

A shows a plan of the mold.
B, a section on the line $x\ x$.
C, a horizontal section on the line $y\ y$.

$a\ a$ denote two jaws, hinged at one end, as seen at $b$, and having handles $c$ at their other end, for opening and shutting the mold.

Within or to the inner surfaces of the jaws $a$ are fixed the blocks or pieces $d$, the inner surfaces of all of which, in radial planes through the most inwardly parts thereof, are concentric at all parts in the same horizontal plane with the axial line of the mold when the jaws are closed.

The blocks do not abut when the mold is closed, but are made narrow at their molding faces, and these faces may be curved or circular in cross-section, to correspond with the circular form, in corresponding section, of the bottle or other articles formed or shaped in the mold, or they may be straight in cross-sectional planes, as seen at A, or may even be made angular at their molding lines, edges, or surfaces.

For the number of pieces thus arranged I prefer four, but two or any other greater number may be used.

It will readily be seen that when the bottle is blown in the mold and is rotated, its surface will be brought to the requisite circular form at all points, though the glass is not wholly surrounded by the molding surfaces.

The molding pieces may be made of metal or wood, as in common molds, or of steatite or other stone, but I prefer to make them of the material previously mentioned, namely, gas-retort carbon, or gas "corrosion," cutting each piece of this material to the proper shape, as shown in the drawings, and fixing it directly to the inner surface of the jaw, by screws $e$, as shown at D, or making it dovetailing in cross-section, and securing it in a dovetailing mortise or recess, in a stock, $f$, as shown at A, B, and C.

By making the mold with open spaces, I am enabled to make use of thin or narrow pieces of material, like graphite, large and perfect pieces of which cannot easily be obtained; and whatever material be used, there is much less molding surface to be turned or planed down than when the mold is made with a continuous surface.

I claim a mold, for forming or shaping bottles and other blown glassware, circular in section, having its molding surface formed on the inner faces or edges of pieces or blocks, with open spaces between them, substantially as described.

Also, forming each jaw of a mold of a series of pieces of gas-retort carbon, or gas corrosion, having spaces between them, each of which pieces forms one of the faces of the mold, substantially as shown and described.

Also, in combination with the jaws $a\ a$, the molding-blocks or pieces, removably attached thereto, substantially as described.

Also, in combination with the jaws and mold-blocks or pieces, the stocks $f$, for receiving the blocks, substantially as shown and described.

HIRAM DILLAWAY.

Witnesses:
JOSEPH L. ROGERS,
LUTHER DRAKE.